US012696240B2

(12) United States Patent　　　　　(10) Patent No.:　US 12,696,240 B2
Tsai et al.　　　　　　　　　　　　　　(45) Date of Patent:　　　Jul. 28, 2026

(54) ELECTRONIC DEVICE AND METHOD FOR PHYSICAL UPLINK CONTROL CHANNEL (PUCCH) RESOURCE CONFIGURATION

(71) Applicant: MEDIATEK INC., Hsinchu (TW)

(72) Inventors: Cheng-Rung Tsai, Hsinchu (TW); Chun-Hsuan Kuo, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 511 days.

(21) Appl. No.: 17/635,242

(22) PCT Filed: Aug. 14, 2020

(86) PCT No.: PCT/CN2020/109274
§ 371 (c)(1),
(2) Date: Feb. 14, 2022

(87) PCT Pub. No.: WO2021/027936
PCT Pub. Date: Feb. 18, 2021

(65) Prior Publication Data
US 2022/0295452 A1　　Sep. 15, 2022
Related U.S. Application Data

(60) Provisional application No. 62/887,057, filed on Aug. 15, 2019.

(51) Int. Cl.
*H04W 72/02*　　　(2009.01)
*H04W 72/04*　　　(2023.01)
(Continued)

(52) U.S. Cl.
CPC ....... *H04W 72/02* (2013.01); *H04W 72/0453* (2013.01); *H04W 72/21* (2023.01)

(58) Field of Classification Search
CPC . H04W 72/02; H04W 72/0453; H04W 72/21; H04L 5/0007; H04L 5/0053; H04L 5/0094
See application file for complete search history.

(56) References Cited

U.S. PATENT DOCUMENTS 10,638,463　B2 *　4/2020　Park ...................... H04W 72/21
2016/0174211　A1 *　6/2016　Gao ................... H04W 72/1263
　　　　　　　　　　　　　　　　　　　　　　　　370/329
(Continued)

FOREIGN PATENT DOCUMENTS

CN　　102437901 A　　5/2012
CN　　104205972 A　　12/2014
(Continued)

OTHER PUBLICATIONS

International Search Report mailed on Oct. 28, 2020 in PCT/CN2020/109274 filed on Aug. 14, 2020, total 4 pages.
(Continued)

*Primary Examiner* — Abdullahi E Salad
(74) *Attorney, Agent, or Firm* — Winston Hsu

(57)　　　　　　　ABSTRACT

Aspects of the disclosure provide an electronic device including a transceiver and processing circuitry and a method for wireless communication. The transceiver is configured to receive configuration information for physical uplink control channel (PUCCH) resource configuration from a network in a wireless communication system. The configuration information can indicate a first interlace that includes a first set of frequency domain physical resources. The processing circuitry is configured to determine resource allocation in a frequency domain for the PUCCH resource based at least on the first interlace. The transceiver can transmit uplink control information (UCI) on a PUCCH resource. In an example, the configuration information further indicates sub-band allocation information of at least one sub-band for the PUCCH resource, and the processing circuitry determines the resource allocation in the frequency domain for the PUCCH resource based at least on the first interlace and the sub-band allocation information.

16 Claims, 11 Drawing Sheets

(51) Int. Cl.
    *H04W 72/0453*        (2023.01)
    *H04W 72/21*          (2023.01)

(56)                    References Cited

U.S. PATENT DOCUMENTS

| 2018/0020429 | A1* | 1/2018 | Aiba ........................ H04L 5/001 |
|---|---|---|---|
| 2018/0220413 | A1 | 8/2018 | Yang et al. |
| 2019/0104517 | A1* | 4/2019 | Park ...................... H04W 72/21 |
| 2019/0159193 | A1* | 5/2019 | Zhang .................. H04L 5/0048 |
| 2020/0220663 | A1* | 7/2020 | Tsai ...................... H04L 1/1822 |
| 2020/0221445 | A1* | 7/2020 | Tsai .................. H04W 72/0453 |
| 2021/0321392 | A1* | 10/2021 | Hooli ................... H04L 5/0053 |
| 2021/0329676 | A1* | 10/2021 | Yang ...................... H04W 4/46 |
| 2022/0166586 | A1* | 5/2022 | Kundu ............... H04L 27/0006 |

FOREIGN PATENT DOCUMENTS

| CN | 106105084 A | 11/2016 |
|---|---|---|
| CN | 106470089 A | 3/2017 |
| CN | 108347776 A | 7/2018 |
| CN | 108886452 A | 11/2018 |
| KR | 1020190013452 A | 2/2019 |
| WO | 2017/217799 A1 | 12/2017 |
| WO | WO 2018/075745 A1 | 4/2018 |

OTHER PUBLICATIONS

Written Opinion mailed on Oct. 28, 2020 in PCT/CN2020/109274 filed on Aug. 14, 2020, total 3 pages.

LG Electronics, "Physical layer design of UL signals and channels for NR-U", 3GPP TSG RAN WG1 #96bis, Apr. 8-12, 2019, 11 pages.

* cited by examiner

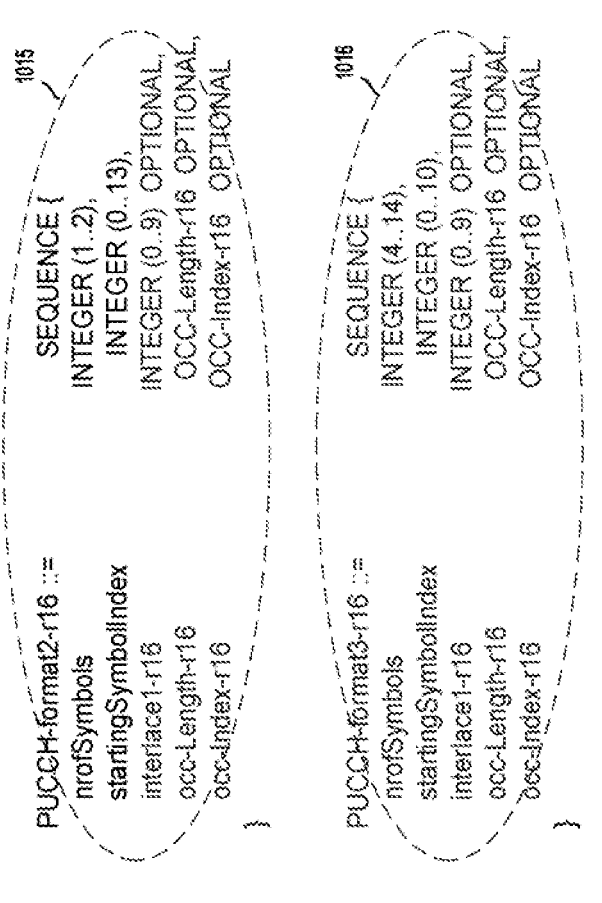

```
PUCCH-format2-r16 ::=         SEQUENCE {
nrofSymbols                    INTEGER (1..2),
startingSymbolIndex            INTEGER (0..13),
interlace1-r18                 INTEGER (0..9)  OPTIONAL,
occ-Length-r16                 OCC-Length-r16  OPTIONAL,
occ-Index-r16                  OCC-Index-r16   OPTIONAL
}                                                          1015
```

```
PUCCH-format3-r16 ::=         SEQUENCE {
nrofSymbols                    INTEGER (4..14),
startingSymbolIndex            INTEGER (0..10),
interlace1-r16                 INTEGER (0..9)  OPTIONAL,
occ-Length-r16                 OCC-Length-r16  OPTIONAL,
occ-Index-r16                  OCC-Index-r16   OPTIONAL
}                                                          1016
```

*FIG. 11*

ELECTRONIC DEVICE AND METHOD FOR PHYSICAL UPLINK CONTROL CHANNEL (PUCCH) RESOURCE CONFIGURATION

INCORPORATION BY REFERENCE

This present application claims the benefit of priority to U.S. Provisional Application No. 62/887,057, "Frequency domain Resource Configuration for Interlaced PUCCH" filed on Aug. 15, 2019, which is incorporated by reference herein in its entirety.

TECHNICAL FIELD

The present application relates generally to wireless communication technology including resource configurations for uplink channels.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An electronic device can communicate with a wireless communication network by transmitting and receiving signals wirelessly. Uplink L1/L2 control signaling can be used to support data transmission on downlink or uplink transport channels. In Long Term Evolution (LTE) or New Radio (NR) networks, uplink control information (UCI) can be transmitted over resources for uplink L1/L2 control on a physical uplink control channel (PUCCH). The UCI can include hybrid automatic repeat request acknowledgements (HARQ-ACKs), channel state information (CSI), and scheduling requests (SRs).

SUMMARY

Aspects of the disclosure provide an electronic device including a transceiver and processing circuitry and a method for wireless communication. The transceiver can receive configuration information for physical uplink control channel (PUCCH) resource configuration from a network in a wireless communication system. The configuration information can indicate a first interlace that includes a first set of frequency domain physical resources. The processing circuitry can determine resource allocation in a frequency domain for a PUCCH resource based at least on the first interlace. The transceiver can transmit uplink control information (UCI) on the PUCCH resource.

In an embodiment, the configuration information further indicates a second interlace that includes a second set of frequency domain physical resources. The processing circuitry can determine the resource allocation in the frequency domain for the PUCCH resource based on the first interlace and the second interlace. In an example, the configuration information further indicates a PUCCH format configuration for the PUCCH resource and the PUCCH format configuration indicates the second interlace.

In an embodiment, the configuration information further indicates a number of one or more interlaces for the PUCCH resource. The one or more interlaces can include the first interlace. The processing circuitry can determine the resource allocation in the frequency domain for the PUCCH resource based on the one or more interlaces.

In an embodiment, the configuration information further indicates sub-band allocation information of at least one sub-band within a bandwidth for the PUCCH resource. The processing circuitry can determine the resource allocation in the frequency domain for the PUCCH resource based at least on the first interlace and the sub-band allocation information. In an example, the processing circuitry can determine the resource allocation in the frequency domain for the PUCCH resource as an intersection of the first set of frequency domain physical resources and the at least one sub-band.

In an example, the configuration information further indicates a second interlace that includes a second set of frequency domain physical resources. The processing circuitry can determine the resource allocation in the frequency domain for the PUCCH resource as an intersection of the first set and the second set of frequency domain physical resources and the at least one sub-band.

In an example, the bandwidth is a carrier or a bandwidth part (BWP) in a carrier.

In an embodiment, the configuration information further indicates sub-band allocation information of at least one sub-band within a bandwidth for the PUCCH resource. The processing circuitry can determine resource allocation in the frequency domain for at least one candidate resource based at least on the first interlace and the sub-band allocation information. The processing circuitry can determine the resource allocation in the frequency domain for the PUCCH resource from the at least one candidate resource. In an example, the processing circuitry can determine the resource allocation in the frequency domain for each of the at least one candidate resource as an intersection of the first set of frequency domain physical resources and a corresponding one of the at least one sub-band.

In an example, the configuration information further indicates a second interlace that includes a second set of frequency domain physical resources. The processing circuitry can determine the resource allocation in the frequency domain for each of the at least one candidate resource as an intersection of the first set and the second set of frequency domain physical resources and a corresponding one of the at least one sub-band.

BRIEF DESCRIPTION OF THE DRAWINGS

Various embodiments of this disclosure that are proposed as examples will be described in detail with reference to the following figures, wherein like numerals reference like elements, and wherein:

FIG. 9 shows an example of a resource block set configuration according to an embodiment of the disclosure;

FIGS. 10-11 show examples of PUCCH formats according to embodiments of the disclosure.

DETAILED DESCRIPTION OF EMBODIMENTS

Figure 1:
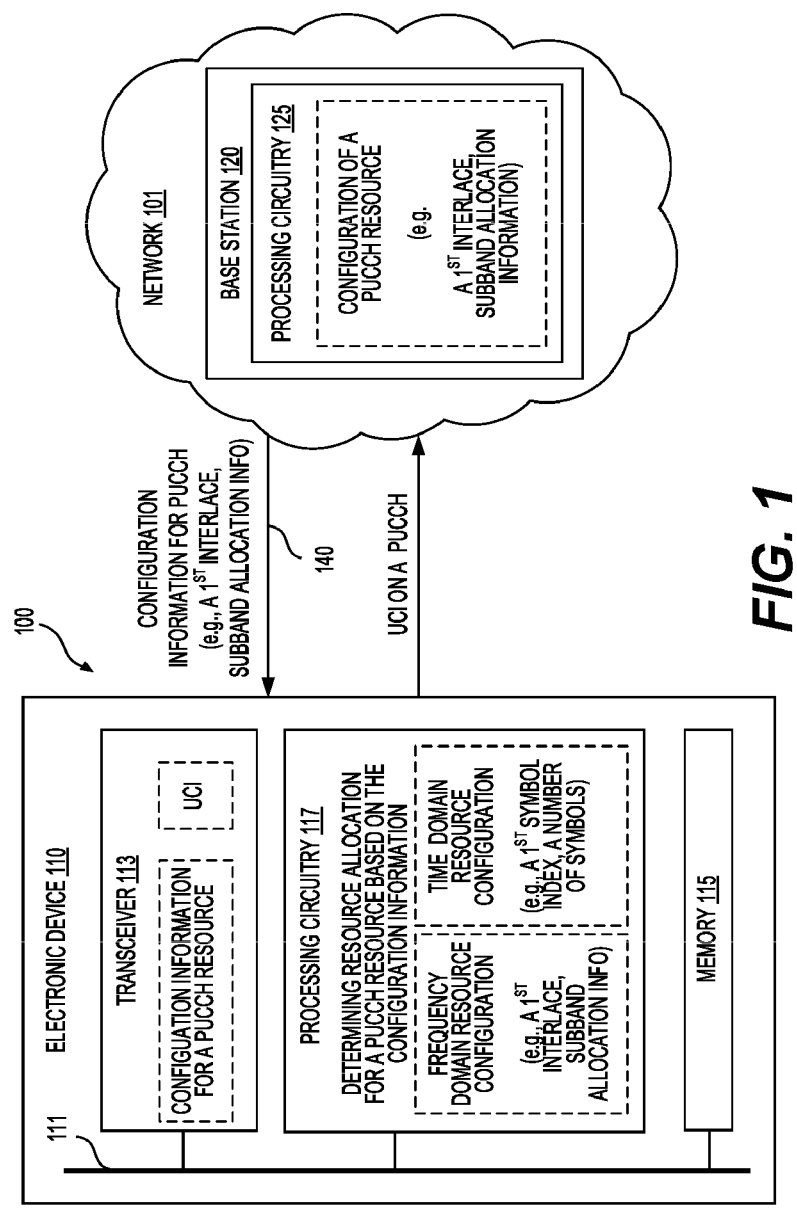
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. The electronic device 110 can be configured to receive, from the network 101, configuration information 140 for physical uplink control channel (PUCCH) resource configuration. The configuration information 140 can indicate a first interlace that includes a first set of frequency domain physical resources for a PUCCH resource. The electronic device 110 can be configured to determine resource allocation in a frequency domain for the PUCCH resource based at least on the first interlace. The configuration information 140 can further indicate a second interlace that includes a second set of frequency domain physical resources, sub-band allocation information of at least one sub-band within a bandwidth for the PUCCH resource, and/or the like. In addition to the first interlace, the electronic device 110 can determine the resource allocation in the frequency domain for the PUCCH resource based on the second interlace, the sub-band allocation information, and/or the like.

In an example, the network 101 includes a fifth generation (5G) radio access network (RAN) (or Next Generation (NG) RAN) and a 5G core network (5GC) that uses 5G mobile network technology. A base station 120 in the network 101 is a next generation Node B (gNB) specified in 5G new radio (NR) air interface standards developed by 3rd Generation Partnership Project (3GPP).

The network 101 includes various base stations, such as the base station 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE), NR technology, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN. A core network can be an evolved packet core (EPC), a 5GC, and the like.

In various examples, the base station 120 can be referred to as a Node B, an evolved Node B, a gNB, and the like. The base station 120 includes hardware components and software components configured to enable wireless communications between the base station 120 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 7 GHz and a frequency range 2 (FR2) includes frequencies in the range 24.25-52.6 GHz. Signals (or beams) having mmWave frequencies as carrier frequencies, referred to as high frequency (HF) signals, can experience large propagation loss and can be sensitive to blockage. Accordingly, for the HF signals, the base station 120 and the electronic device 110 can perform beamformed transmission and/or reception to compensate for the propagation loss.

In an embodiment, the electronic device 110 can be any suitable electronic device that is configured to determine the resource allocation for the PUCCH resource based on the configuration information (e.g., including the first interlace, the second interlace (optional), the sub-band allocation information (optional)) for the PUCCH resource. The resource allocation can include the resource allocation (e.g., resource blocks (RBs)) in the frequency domain and the resource allocation (e.g., symbol(s)) in a time domain. In an example, the electronic device 110 is a terminal device (e.g., user equipment) for wireless communication, such as a cell phone, a smart phone, a tablet computer, a laptop, a smart device, a wearable device, and the like.

Referring to FIG. 1, the electronic device 110 can include a transceiver 113, processing circuitry 117, and memory 115 that are coupled together, for example, using a bus architecture 111. The transceiver 113 can be configured to receive signals from and transmit signals to the network 101 (e.g., the base station 120). The signals can include the HF signals (e.g., FR2) and the LF signals (e.g., FR1). The signals can be sent via directional beams or beam pairs in beamformed transmission/reception.

Referring to FIG. 1, the electronic device 110 can transmit (e.g., report) uplink control information (UCI) over a PUCCH, for example, to support data transmission on downlink or uplink transport channels. UCI can include hybrid automatic repeat request acknowledgements (HARQ-ACKs) for received downlink shared channel (DL-SCH) transport blocks, channel state information (CSI) related to downlink channel conditions useful for downlink scheduling, and scheduling requests (SRs) for uplink resources for uplink shared channel (UP-SCH) transmission. The UCI can be transmitted by the transceiver 113 over the PUCCH and can be received by the network 101.

UCI can be transmitted over a PUCCH resource, for example, specifically assigned for a PUCCH transmission. For example, the PUCCH resource can be a frequency domain and time domain physical transmission resource, such as resources including a number of symbols and a number of RBs (e.g., physical resource blocks (PRBs)) over a resource grid (e.g., an orthogonal frequency division multiplex (OFDM) resource grid). In an example, a PUCCH resource can be configured by the network 101 (e.g., the base station 120) for the electronic device 110. The configuration can be performed, for example, through radio resource control (RRC) signaling, media access (MAC) layer control element (CE), downlink control information, or a combination thereof.

The received signals from the network 101 (e.g., the base station 120) can include the configuration information 140. The configuration information 140 can indicate frequency domain physical resource information and time domain resource information for configuring the PUCCH resource. The frequency domain physical resource information can include a first interlace index for the first interlace (or a starting interlace), a starting RB index for a starting RB in the first interlace, a second interlace index for the second interlace, a number of one or more interlaces that can include the first interlace, and the sub-band allocation information for the at least one sub-band, for example, within a bandwidth. The configuration information 140 can also indicate bandwidth information for a bandwidth, for example, indicating information of a carrier and a bandwidth part (BWP) in the carrier. Each of the bandwidth, the carrier, and the BWP can include a plurality of RBs according the configuration information 140. In an example, the first interlace and the second interlace are within the bandwidth or the carrier. The configuration information 140 can further indicate sub-band information for one or more sub-bands within a bandwidth. Each of the sub-bands can include a plurality of RBs within the bandwidth according to the configuration information 140. In an example, the sub-band information can be also predefined in a specification.

The one or more interlaces can optionally include the second interlace and additional interlace(s). In an example, the one or more interlaces includes the first interlace, and the number of the one or more interlaces is 1. In an example, the one or more interlaces includes the first interlace and the second interlace, and the number of the one or more interlaces is 2. In an example, the one or more interlaces includes the first interlace, the second interlace, and the additional interlace(s), and thus the number of the one or more interlaces is larger than 2.

The time domain resource information can include symbol(s) allocated for the PUCCH resource, for example, as indicated based on a starting symbol (or a first symbol) indication (e.g., a first symbol index) and a number of symbol(s).

Figure 2:
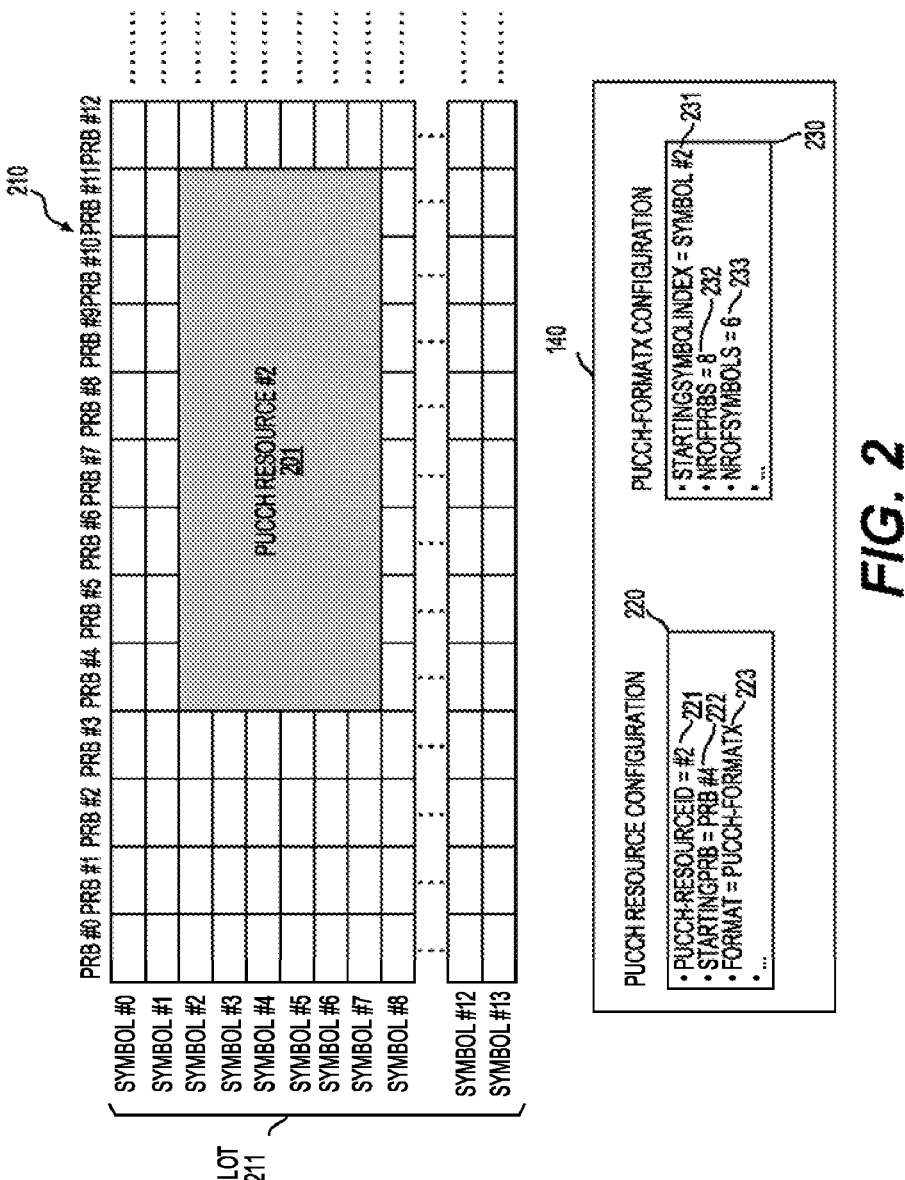
FIG. 2 shows an example of a physical uplink control channel (PUCCH) resource 201 according to an embodiment of the disclosure.

FIG. 2 shows an example of a PUCCH resource 201 according to an embodiment of the disclosure. The PUCCH resource 201 can include frequency domain resource(s), such as PRBs (e.g., PRB #4-#11), and time domain resource(s), such as symbols (e.g., symbol #2-#7). The PUCCH resource 201 can be configured based on a PUCCH resource configuration 220, a resource format configuration (e.g., a PUCCH format configuration) 230, and/or the like. The PUCCH resource 201 can be configured for the electronic device 110. The configuration information 140 can indicate the PUCCH format configuration 230 for the PUCCH resource configuration 220. In an example, the configuration information 140 including the PUCCH resource configuration 220 and/or the resource format configuration 230 can be signaled from the network 101 to the electronic device 110, for example, via RRC signaling.

The PUCCH resource configuration 220 can indicate a PUCCH resource ID (e.g., PUCCH-RESOURCEID=#2) 221, a starting frequency domain physical resource, such as a starting PRB (e.g., STARTINGPRB=PRB #4) 222 in a frequency domain, a resource format (e.g., PUCCH-FOR-MATX, where 'X' can include a value indicating a specific format) 223, and/or other parameters. The resource format configuration 230 corresponding to the resource format 223 can indicate a starting symbol, for example, based on a starting symbol index (e.g., STARTINGSYMBOLINDEX=symbol #2) 231, a number of symbols (optional) 233, a number of frequency domain physical resources, such as a number of PRBs (e.g., NROF-PRBS=8) 232 (optional), and/or other parameters. When the number of frequency domain physical resources 232 is equal to 1, the number of frequency domain physical resources 232 can be omitted from the resource format configuration 230. Similarly, when the number of symbols 233 is equal to 1, the number of symbols 233 can be omitted.

Referring to FIG. 2, the PUCCH resource 201 is shown in a resource grid (e.g., an OFDM resource grid) 210. The resource grid 210 can include a plurality of PRBs in the frequency domain each having an index (e.g., #0, #1, #2, and the like), and a plurality of symbols in the time domain each having an index (e.g., #0, #1, #2, and the like). The PUCCH resource 201 can be specified by the PUCCH resource configuration 220 and the resource format configuration 230. The PUCCH resource 201 can be located within a slot 211 that, for example, includes 14 symbols having indices from #0 to #13. For example, the PUCCH resource 201 has a PUCCH resource ID of #2, includes the PRBs #4-#11 (starting from the PRB #4 indicated by 222 and including eight PRBs indicated by 232) in the frequency domain, and includes the symbols #2-#7 (starting from the symbol #2 indicated by 231 and including six symbols indicated by 233). As described above, a PUCCH resource (e.g., the PUCCH resource 201) in the frequency and the time domain can be identified based on a PUCCH resource configuration (e.g., the PUCCH resource configuration 220).

In some examples, the PUCCH resource configuration 220 further indicates an intra-slot frequency hopping and a starting frequency domain physical resource (e.g., for a second hop) after frequency hopping. The resource format 223 (e.g., the PUCCH-formatX) can be any suitable format, such as a PUCCH-format( ) (e.g., X=0), a PUCCH-format1 (e.g., X=1), a PUCCH-format2 (e.g., X=2), a PUCCH-format3 (e.g., X=3), a PUCCH-format4 (e.g., X=4), a PUCCH-format2-r16, a PUCCH-format3-r16, or the like, as shown below in FIGS. 10-11.

In addition to configuring a PUCCH resource using consecutive RBs (e.g., the PRBs #4-#11) as shown in FIG. 2, a PUCCH resource can be configured based on non-consecutive RBs, such as RBs in an interlace structure (also referred to as a block-interlace structure or an interlace). In an example, such as in an unlicensed band, frequency domain physical resources with the block-interlace structure can be configured for a PUCCH resource, for example, to comply with an Occupied Channel Bandwidth (OCB) and a maximum power spectral density (PSD) level requirements. Accordingly, the PUCCH resource (e.g., in an unlicensed band) can be configured with one or more interlaces.

An interlace can be a basic unit of frequency domain resource allocation and can include a set of frequency domain physical resources, for example, in a certain bandwidth (e.g., a carrier, or a BWP in a carrier). The set of frequency domain physical resources can be equally spaced in the frequency domain within the certain bandwidth. FIG.

3 shows an example of M (e.g., M=10) interlaces #0-#9 according to an embodiment of the disclosure. A resource grid (e.g., an OFDM resource grid) 310 can include a plurality of symbols (e.g., symbols #0-#13) in the time domain and a plurality of RBs (e.g., RB #0-#105) in the frequency domain A subcarrier spacing (SCS) can be any suitable frequency, such as 15 kHz, 30 kHz, 60 kHz, 120 kHz, 240 kHz, or the like. In an example, the SCS is 15 kHz.

Figure 3:
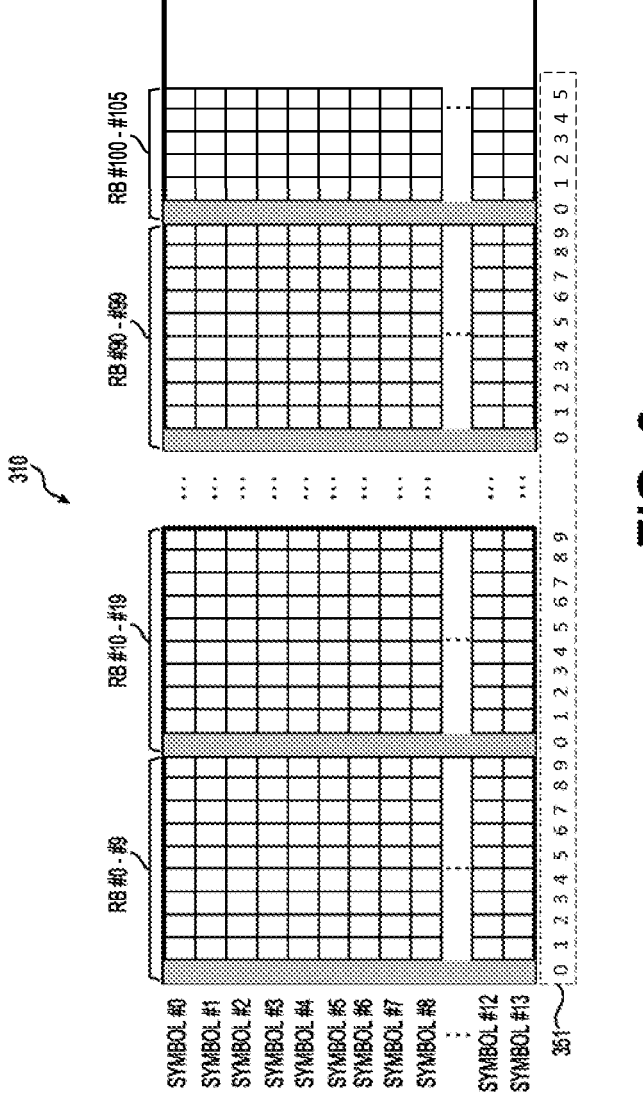
FIG. 3 shows an example of a plurality of interlaces according to an embodiment of the disclosure.

The M interlaces #0-#9 can be specified or defined based on the resource grid 310. In an example, the bandwidth (e.g., 20 MHz) includes 106 RBs (e.g., RBs #0-105), and the M interlaces are within the bandwidth. Each interlace (e.g., the interlace #m having an index m) of the M interlaces #0-#9 can include N RBs. N can be any suitable number, such as 10 or 11. Referring to FIG. 3, when m is 0, 1, 2, 3, 4, or 5, the interlace #m includes 11 RBs: RB #(0+m), RB #(M+m), RB #(2×M+m), RB #(3×M+m), RB #(4×M+m), RB #(5× M+m), RB #(6×M+m), RB #(7×M+m), RB #(8×M+m), RB #(9×M+m), and RB #(10×M+m) where M is 10. In an example, the interlace #0 (m=0; highlighted by gray color in FIG. 3) includes 11 RBs: RB #0, RB #10, RB #20, . . . , and RB #100, and the interlace #1 includes 11 RBs: RB #1, RB #11, RB #21, . . . , and RB #101. When m is 6, 7, 8, and 9, the interlace #m includes 10 RBs: RB #(0+m), RB #(M+m), RB #(2×M+m), RB #(3×M+m), RB #(4×M+m), RB #(5× M+m), RB #(6×M+m), RB #(7×M+m), RB #(8×M+m), and RB #(9×M+m). For example, the interlace #9 includes 10 RBs: RB #9, RB #19, RB #29, . . . , and RB #99. Row 351 in FIG. 3 lists the index m of the respective interlace #m.

The set of frequency domain physical resources in the interlace #m is equally spaced in the frequency domain within the certain bandwidth, and a frequency difference (or a frequency spacing) between two adjacent RBs in the interlace #m can correspond to a frequency difference of M RBs (e.g., 10 RBs).

Referring back to FIG. 1, the processing circuitry 117 can be configured to determine resource allocation for the PUCCH resource based on the configuration information 140 for configuring the PUCCH resource. The processing circuitry 117 can be configured to determine the resource allocation in the frequency domain for the PUCCH resource based on the configuration information 140. As described above, the PUCCH resource can be configured based on one or more interlaces. The configuration information 140 can indicate information for the one or more interlaces, such as the first interlace (or the starting interlace) that includes the first set of frequency domain physical resources for the PUCCH resource, the sub-band allocation information for the at least one sub-band within a bandwidth for the PUCCH resource, the second interlace that includes the second set of frequency domain physical resources for the PUCCH resource, and/or the like. According to aspects of the disclosure, the processing circuitry 117 can be configured to determine the resource allocation in the frequency domain for the PUCCH resource based at least on the first interlace. In an embodiment, the processing circuitry 117 can determine the resource allocation in the frequency domain for the PUCCH resource based on the first interlace and the second interlace. In another embodiment, the processing circuitry 117 can determine the resource allocation in the frequency domain for the PUCCH resource based at least on the first interlace and the sub-band allocation information. In an example, the processing circuitry 117 is configured to determine that the PUCCH resource includes a subset of the first set of frequency domain physical resources that is within the at least one sub-band. The subset of the first set of frequency domain physical resources can be an intersection of the first set of frequency domain physical resources and the at least one sub-band. In an example, the processing circuitry can determine the resource allocation in the frequency domain for the PUCCH resource as the intersection of the first set of frequency domain physical resources and the at least one sub-band. In an embodiment, the processing circuitry 117 is configured to determine that the PUCCH resource can include a combined subset of the first set and the second set of frequency domain physical resources that is within the at least one sub-band. The combined subset can be an intersection of the first set and the second set of frequency domain physical resources and the at least one sub-band. In an example, the processing circuitry is configured to determine the resource allocation in the frequency domain for the PUCCH resource as the intersection of the first set and the second set of frequency domain physical resources and the at least one sub-band.

In an embodiment, the processing circuitry 117 is configured to determine resource allocation in the frequency domain for at least one candidate resource based at least on the first interlace and the sub-band allocation information. The processing circuitry 117 is further configured to determine the resource allocation in the frequency domain for the PUCCH resource from the at least one candidate resource. In an example, the processing circuitry 117 is configured to determining that the at least one candidate resource includes a subset of the first set of frequency domain physical resources that is within the at least one sub-band where the subset of the first set of frequency domain physical resources can be an intersection of the first set of frequency domain physical resources and the at least one sub-band. In an example, the processing circuitry is configured to determine the resource allocation in the frequency domain for each of the at least one candidate resource as an intersection of the first set of frequency domain physical resources and a corresponding one of the at least one sub-band. In a further example, the processing circuitry 117 is configured to determine that the at least one candidate resource can include a combined subset of the first set and the second set of frequency domain physical resources that is within the at least one sub-band where the combined subset can be an intersection of the first set and the second set of frequency domain physical resources and the at least one sub-band. In an example, the processing circuitry is configured to determine the resource allocation in the frequency domain for each of the at least one candidate resource as an intersection of the first set and the second set of frequency domain physical resources and a corresponding one of the at least one sub-band.

As described above, the at least one sub-band can be within the bandwidth, and the bandwidth can be a carrier or a BWP in a carrier.

As described above, the configuration information 140 can indicate the time domain resource information, such as symbol(s) allocated for the PUCCH resource (e.g., a starting symbol (or a first symbol) indication (e.g., a first symbol index) and a number of symbol(s)). The processing circuitry 117 can be configured to determine the resource allocation in the time domain for the PUCCH resource based on the time domain resource information in the configuration information 140, as described above with reference to FIG. 2.

The processing circuitry 117 can be implemented using various techniques, such as integrated circuits, one or more processors executing software instructions, and the like.

The memory 115 can be any suitable device for storing data and instructions to control operations of the electronic device 110. The memory 115 can store information (e.g., configuration information (e.g., the configuration information 140), a PUCCH resource configuration (e.g., 220), a PUCCH resource format configuration (e.g., 230), a block-interlace structure (e.g., the interlaces in FIG. 3)) and instructions associated with the configuration of a PUCCH resource, and software instructions to be executed by a processor, such as the processing circuitry 117. The memory 115 can store UCI that is to be transmitted from the electronic device 110 to the network 101.

In an embodiment, the memory 115 can be non-volatile memory, such as read-only memory, flash memory, magnetic computer storage devices, hard disk drives, solid state drives, floppy disks, and magnetic tape, optical discs, and the like. In an embodiment, the memory 115 can be a random access memory (RAM). In an embodiment, the memory 115 can include non-volatile memory and volatile memory.

The network 101 can include processing circuitry 125 that can configure a PUCCH resource for the electronic device 110. The processing circuitry 125 can be located in any suitable location within the network 101. In an example, the processing circuitry 125 is located in the base station 120. The processing circuitry 125 can determine the configuration information 140 (e.g., the first interlace for the PUCCH resource, the sub-band allocation information, the second interlace for the PUCCH resource, and/or the like). The configuration information 140 can be transmitted from the network 101 (e.g., the base station 120) to the electronic device 110. The UCI can be transmitted from the electronic device 110 over the PUCCH and can be received by the network 101.

As described above, the resource allocation in the frequency domain for the PUCCH resource can be determined based at least on the first interlace in the configuration information 140 for the PUCCH resource. According to aspects of the disclosure, the PUCCH resource can be configured based on the first interlace (or the starting interlace). In an example, in addition to the first interlace, the configuration information 140 further indicates the second interlace, and the resource allocation in the frequency domain for the PUCCH resource can be determined based on the first interlace and the second interlace. In an example, the configuration information 140 can indicate the number of the one or more interlaces for the PUCCH resource where the one or more interlaces includes the first interlace. Accordingly, the resource allocation in the frequency domain for the PUCCH resource can be determined based on the one or more interlaces.

Figure 4:
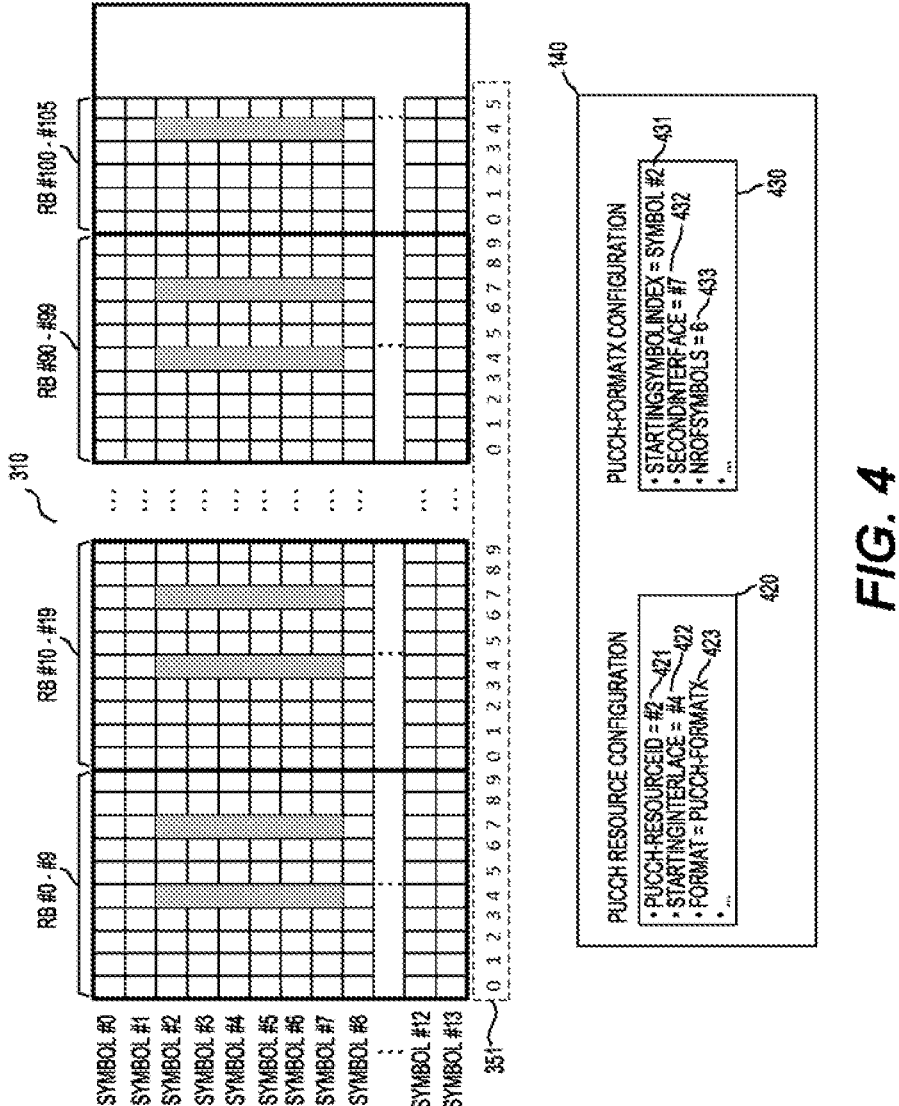
FIG. 4 shows an example of a PUCCH resource that is configured based at least on a first interlace according to embodiments of the disclosure.

FIG. 4 shows an example of the PUCCH resource that is configured based on the first interlace according to embodiments of the disclosure. As described above, the resource grid (e.g., the OFDM resource grid) 310 can include the plurality of symbols (e.g., symbols #0-#13) in the time domain and the plurality of RBs (e.g., RB #0-#105) in the frequency domain. The PUCCH resource can be configured based on a PUCCH resource configuration 420 included in the configuration information 140. The PUCCH resource configuration 420 can indicate a PUCCH resource ID (e.g., #2) 421, a starting frequency domain physical resource, such as the starting interlace or the first interlace (e.g., the interlace #4) 422 in the frequency domain, a resource format (e.g., PUCCH-FORMATX, where 'X' can include a value indicating a specific format) 423, and/or other parameters. A resource format configuration (e.g., a PUCCH format configuration) 430 included in the configuration information 140 corresponding to the resource format 423 can indicate a starting symbol (e.g., a starting symbol index or the symbol

2) 431, a number of symbols (e.g., 6 symbols) 433, the second interlace (e.g., based on the second interlace index) 432 (e.g., the interlace #7), and/or other parameters. When the second interlace is not available or does not exist, the second interlace 432 can be omitted from the resource format configuration 430. Similarly, when the number of symbols 433 is equal to 1, the number of symbols 433 can be omitted. The configuration information 140 can indicate the PUCCH format configuration 430 for the PUCCH resource configuration 420 and the PUCCH format configuration 430 can indicate the second interlace 432.

As described above with reference to FIG. 3, the interlace structure can include the M (e.g., M=10) interlaces #0-#9. Based on the first interlace (e.g., the first interlace index) indicated by the PUCCH resource configuration 420 and the second interlace (e.g., the second interlace index) 432 indicated by the resource format configuration 430, the PUCCH resource can include the interlace #4 (or the first interlace) indicated by 422 and the interlace #7 (or the second interlace) indicated by 432 in the frequency domain Based on the resource format configuration 430 (e.g., 431 and 433), the PUCCH resource can include the symbols #2-#7 in the time domain Referring to FIG. 4, the PUCCH resource is highlighted by the gray area in the resource grid 310.

The frequency domain resource configuration for the PUCCH resource can be summarized as below. The interlaces #4 and #7 (highlighted in gray color in FIG. 4) as indicated by the first interlace and the second interlace are configured for the PUCCH resource. Alternatively, the PUCCH resource configured by the interlaces #4 and #7 can be specified by RBs in the interlaces #4 and #7. For example, the interlace #4 corresponds to the interlace #m where m is 4. As described above with reference to FIG. 3, the interlace #4 (i.e., m=4) includes 11 RBs: RB #4, RB #14, RB #24, RB #34, RB #44, RB #54, RB #64, RB #74, RB #84, RB #94, and RB #104. The interlace #7 corresponds to the interlace #m where m is 7. As described above with reference to FIG. 3, the interlace #7 (i.e., m=7) includes 10 RBs: RB #7, RB #17, RB #27, RB #37, RB #47, RB #57, RB #67, RB #77, RB #87, and RB #97.

Figure 5:
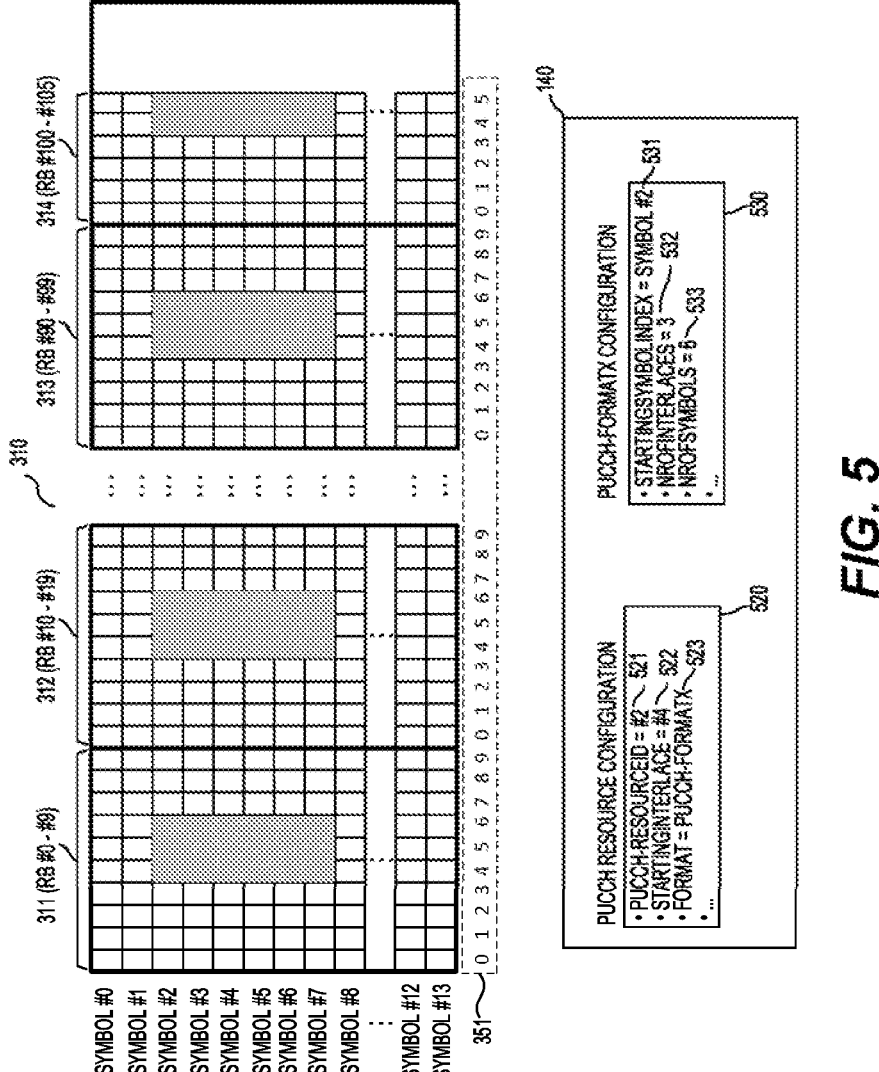
FIG. 5 shows an example of a PUCCH resource that is configured based at least on a first interlace according to embodiments of the disclosure.

FIG. 5 shows an example of the PUCCH resource that is configured based on the first interlace according to embodiments of the disclosure. The resource grid 310 is described above, and thus detailed description is omitted for purposes of brevity. The PUCCH resource can be configured based on a PUCCH resource configuration 520 included in the configuration information 140. The PUCCH resource configuration 520 can indicate a PUCCH resource ID (e.g., #2) 521, a starting frequency domain physical resource, such as the starting interlace or the first interlace (e.g., the interlace #4) 522 in the frequency domain, a resource format (e.g., PUCCH-FORMATX, where 'X' can include a value indicating a specific format) 523, and/or other parameters. A resource format configuration (e.g., a PUCCH format configuration) 530 included in the configuration information 140 corresponding to the resource format 523 can indicate a starting symbol (e.g., a starting symbol index or the symbol #2) 531, a number of symbols (e.g., 6 symbols) 533, a number 532 (e.g., NROFINTERLACES=3) of one or more interlaces configured for the PUCCH resource, and/or other parameters. When the number 532 of the one or more interlaces is one, the number 532 of the one or more interlace can be omitted from the resource format configuration 530. Similarly, when the number of symbols 533 is equal to 1, the number of symbols 533 can be omitted. The configuration information 140 can indicate the PUCCH format configuration 530 for the PUCCH resource configuration 520 and the PUCCH format configuration 530 can indicate the number 532 of one or more interlaces configured for the PUCCH resource.

Based on the PUCCH resource configuration 520 (e.g., 522) and the resource format configuration 530 (e.g., 532) included in the configuration information 140, the processing circuitry 117 can determine that the PUCCH resource can include the interlace #4-#6 in the frequency domain Based on the resource format configuration 430 (e.g., 531 and 533), the PUCCH resource can include the symbols #2-#7. Referring to FIG. 5, the PUCCH resource is highlighted by the gray area in the resource grid 310.

The frequency domain resource configuration for the PUCCH resource can be summarized as below. The interlaces $K_1, K_1+1, \ldots, K_1+K-1$ are configured for the PUCCH resource where K can refer to the number of the one or more interlaces and $K_1$ can refer to the first interlace index (e.g., 522). Referring to FIG. 5, K is 3 and $K_1$ is 4, and thus the interlaces #4, #5, and #6 (highlighted in gray color in FIG. 5) are configured for the PUCCH resource.

The PUCCH resource configured by the interlaces #4-#6 can be specified using RB indices (e.g., #0-#105). The RB index can be described using Eq. (1).

$$RB \text{ index} = RB_{start} + k + n \times M \qquad (1)$$

where $RB_{start}$ refers to the starting frequency domain physical resource, such as the RB #4. k corresponds to 0, 1, ..., and (K−1), and thus k is 0, 1, and 2 for the interlaces #4-#6 (e.g., K=3), respectively. M is the number of interlaces (e.g., the total number of interlaces) in the interlace structure and is 10 in FIG. 5. M can also refer to the frequency difference (or spacing) between consecutive RBs in each of the interlaces #0-#9. n is 0, 1, 2, ..., N−1 for respective RBs in one of the interlaces #4-#6 where N is a number of RBs in the interlace, as described above. N can be 10 or 11. As described above, N is 11 for the interlaces #0-#5, and N is 10 for the interlaces #6-#9.

Based on the above description, for the interlaces #4-#6, $RB_{start}$ is 4, K is 3, M is 10, N is 11. Further, n is 0, 1, 2, ..., 10 for RBs in the respective interlace. Accordingly, for the interlace #4, k is 0, and thus based on Eq. (1), the RB indices for n of 0, 1, 2, ..., 10 are 4, 14, 24, ..., and 104, respectively. Thus, the interlace #4 includes 11 RBs: RB #4, RB #14, RB #24, RB #34, RB #44, RB #54, RB #64, RB #74, RB #84, RB #94, and RB #104. For the interlace #5, k is 1. Similarly, based on Eq. (1), the RB indices for n of 0, 1, 2, ..., 10 are 5, 15, 25, ..., and 105, respectively. Thus, the interlace #5 includes 11 RBs: RB #5, RB #15, RB #25, RB #35, RB #45, RB #55, RB #65, RB #75, RB #85, RB #95, and RB #105. For the interlace #6, k is 2, and thus based on Eq. (1), the RB indices for n of 0, 1, 2, ..., 10 are 6, 16, 26, ..., and 106, respectively. Thus, the interlace #6 includes 11 RBs: RB #6, RB #16, RB #26, ..., and RB #106.

As described above, the resource allocation in the frequency domain for the PUCCH resource can be determined based at least on the first interlace in the configuration information 140 for the PUCCH resource. In an example, the configuration information 140 further indicates the sub-band allocation information of the at least one sub-band for the PUCCH resource. Thus, the resource allocation in the frequency domain for the PUCCH resource can be determined based at least on the first interlace and the sub-band allocation information.

Figure 6:
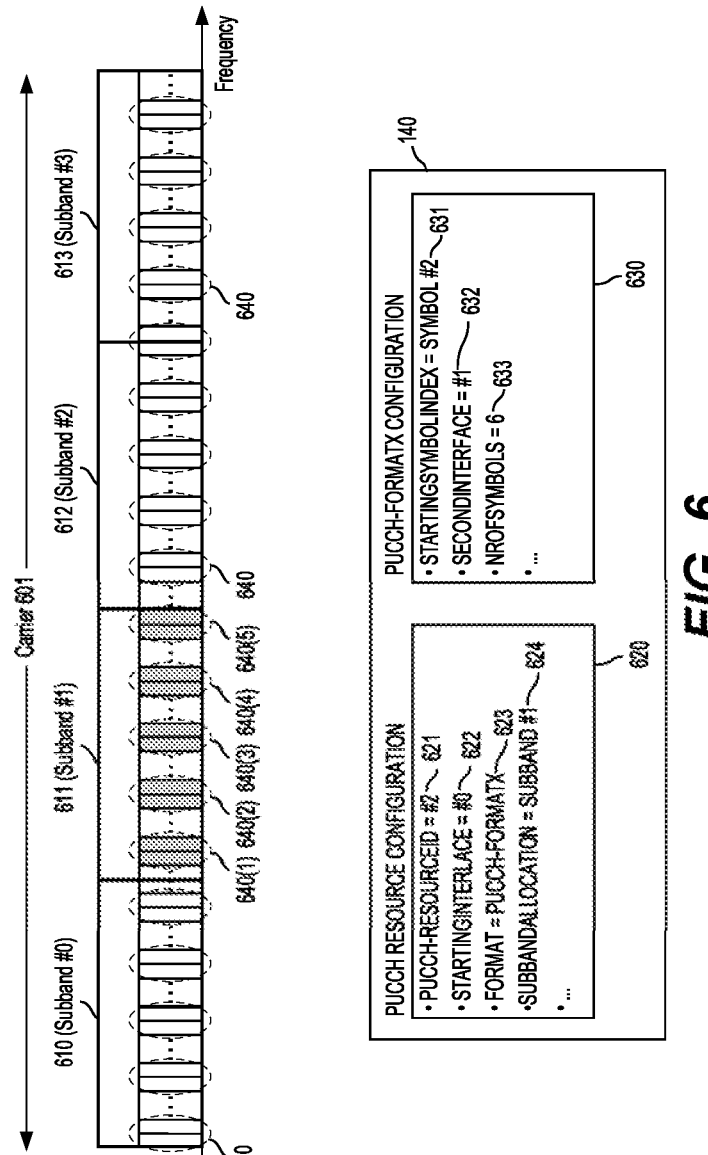
FIG. 6 shows an example of a PUCCH resource that is configured based at least on a first interlace and sub-block allocation information according to embodiments of the disclosure.
Figure 7:
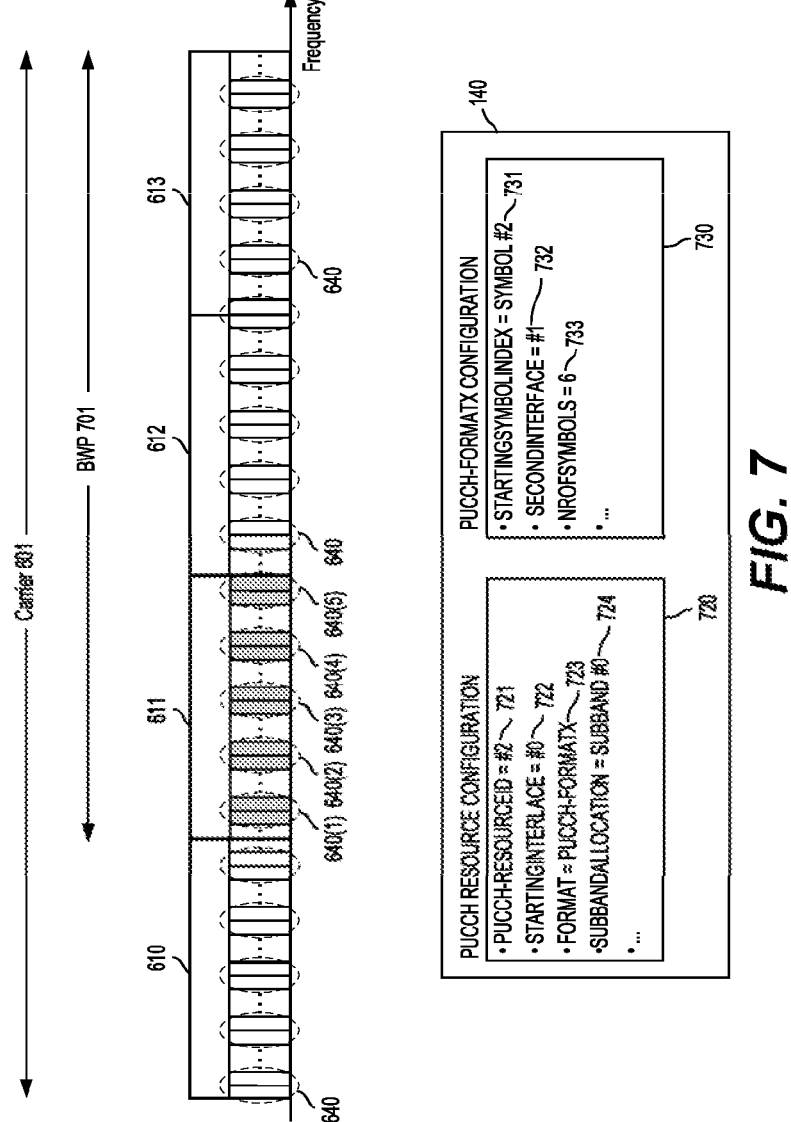
FIG. 7 shows an example of a PUCCH resource that is configured based at least on a first interlace and sub-block allocation information according to embodiments of the disclosure.

The bandwidth can be divided into one or more sub-bands. Each of the sub-bands can include a subset of (available) frequency domain physical resources (e.g., available RBs) of the bandwidth. The configuration information 140 can indicate sub-band information for one or more sub-bands within the bandwidth. Each of the sub-bands can include a subset of RBs of the bandwidth according to the configuration information 140. In an example, the sub-band information can be also predefined in a specification. If there is more than one sub-band within the bandwidth, the more than one sub-band can be orthogonal, for example, without overlap between adjacent sub-bands. The more than one sub-band can be non-orthogonal, for example, with overlap between adjacent sub-bands. The bandwidth can be a carrier or a BWP in a carrier. Referring to FIGS. 6 and 7, the bandwidth, such as a carrier 601, can be divided into sub-bands 610-613 (e.g., referred to as sub-bands #0-#3 in the carrier 601). In an example, the sub-bands #0-#3 are orthogonal. Referring to FIG. 7, the carrier 601 can include a BWP 701, and the BWP 701 can be divided into the sub-bands 611-613 (e.g., referred to as sub-bands #0-#2 in the BWP 701). In general, a carrier can include one or more BWPs.

In a PUCCH resource configuration, the sub-band allocation information can be included to indicate to the electronic device 110 the at least one sub-band within the bandwidth where the at least one sub-band can be configured with the frequency domain physical resource. Referring to FIG. 6, a PUCCH resource configuration 620 included in the configuration information 140 can indicate the sub-band allocation information 624, for example, using a sub-band index in the bandwidth, such as SUBBANDALLOCATION=SUBBAND #1.

In the PUCCH resource configuration 620 included in the configuration information 140, a starting frequency domain physical resource and a resource format can be indicated. Similarly as described above with reference to FIG. 4, the PUCCH resource configuration 620 can indicate a PUCCH resource ID (e.g., #2) 621, the starting frequency domain physical resource, such as a starting interlace or a first interlace (e.g., the interlace #0) 622 in the frequency domain, the resource format (e.g., PUCCH-FORMATX, where 'X' can include a value indicating a specific format) 623, and/or other parameters.

Further, in a resource format configuration (e.g., a PUCCH format configuration) 630 included in the configuration information 140 corresponding to the indicated resource format 623, a number of frequency domain physical resource(s) may be included. The frequency domain physical resource(s) within the bandwidth can be indicated based on the starting frequency domain physical resource (e.g., 622) and the number of frequency domain physical resource(s) when the number of frequency domain physical resources is present. In an example, the number of frequency domain physical resource(s) is one and thus can be omitted.

The frequency domain physical resource(s) can be represented by one or more interlaces that include the first interlace. When the one or more interlaces includes a second interlace, the resource format configuration 630 included in the configuration information 140 can indicate a second interlace 632 using a second interlace index (e.g., the interlace #1), as shown in FIG. 6. When the second interlace is not available or does not exist, the second interlace 632 can be omitted from the resource format configuration 630. Alternatively, the resource format configuration 630 can indicate a number of the one or more interlaces configured for the PUCCH resource by replacing the second interlace

632 with a number (e.g., NROFINTERLACES, such as 2) of the one or more interlaces. The configuration information 140 can indicate the PUCCH format configuration 630 for the PUCCH resource configuration 620 and the PUCCH format configuration 630 can indicate the second interlace 632.

The resource format configuration 630 can indicate a starting symbol (e.g., a starting symbol index or the symbol #2) 631, a number of symbols (e.g., 6 symbols) 633, and/or other parameters. Similarly, when the number of symbols 633 is equal to 1, the number of symbols 633 can be omitted.

The frequency domain physical resources configured for the PUCCH resource can be determined as a combination or an intersection of the at least one sub-band indicated by 624 and the frequency domain physical resource(s) (e.g., indicated by 622, 632 (if available)) indicated by the PUCCH resource configuration 620. Referring to FIG. 6, the frequency domain physical resources indicated by the PUCCH resource configuration 620 includes the first interlace (e.g., the interlace #0 indicated by 622) and the second interlace (e.g., the interlace #1 indicated by 632), and thus the frequency domain physical resources include RBs 640. On the other hand, the at least one sub-band indicated by the sub-band allocation information 624 in the PUCCH resource configuration 620 includes the sub-band 611 (or the sub-band #1 in the carrier 601). The sub-bands 610, 612, and 613 are not included in the at least one sub-band. Therefore, the intersection or the combination of the at least one sub-band (e.g., the sub-band 611) and the frequency domain physical resource(s) 640 can include the RBs 640(1)-640(5). Thus, the RBs 640(1)-640(5) can be determined to be configured for the PUCCH resource. In an example, symbols #2-#7 can be determined to be configured for the PUCCH resource based on 631 and 633. Subsequently, the electronic device 110 can transmit UCI on the PUCCH resource.

Referring to FIG. 7, the carrier 601 includes the BWP 701, and the BWP 701 can be divided into the sub-bands 611-613. The sub-bands 611-613 can be referred to as the sub-bands #0-#2 in the BWP 701, respectively. The PUCCH resource can be configured similarly as that described in FIG. 6 except that the at least one sub-band is within the BWP 701 in FIG. 7, and the sub-band allocation information can refer to one or more sub-band indices in the BWP 701.

A PUCCH resource configuration 720 included in the configuration information 140 can indicate the sub-band allocation information 724, for example, using sub-band indices in the BWP 701, such as SUBBANDALLOCATION=SUBBAND #0 in the BWP 701. The PUCCH resource configuration 720 can indicate a PUCCH resource ID (e.g., #2) 721, a first interlace (e.g., the interlace #0) 722 in the frequency domain, a resource format (e.g., PUCCH-FORMATX, where 'X' can include a value indicating a specific format) 723, and/or other parameters. In a resource format configuration (e.g., a PUCCH format configuration) 730 included in the configuration information 140 corresponding to the indicated resource format 723, a second interlace 732 (e.g., the interlace #1) is indicated. When the second interlace does not exist, the second interlace 732 can be omitted from the resource configuration 730. The resource format configuration 730 can indicate a starting symbol (e.g., a starting symbol index or the symbol #2) 731, a number of symbols (e.g., 6 symbols) 733, and/or other parameters. Similarly, when the number of symbols 733 is equal to 1, the number of symbols 733 can be omitted. The configuration information 140 can indicate the PUCCH format configuration 730 for the PUCCH resource configuration 720 and the PUCCH format configuration 730 can indicate the second interlace 732.

Referring to FIG. 7, frequency domain physical resources indicated by the PUCCH resource configuration 720 include the first interlace (e.g., the interlace #0) and the second interlace (e.g., the interlace #1), and thus the frequency domain physical resources include the RBs 640, as described above with reference to FIG. 6. On the other hand, the at least one sub-band indicated by the sub-band allocation information 724 in the PUCCH resource configuration 720 includes the sub-band 611 (referred to as the sub-band #0 in the BWP 701). The sub-bands 612-613 in the BWP 701 are not included in the at least one sub-band. Therefore, the intersection or the combination of the at least one sub-band (e.g., the sub-band 611) and the frequency domain physical resources 640 can include the RBs 640(1)-640(5). Thus, the RBs 640(1)-640(5) can be determined to be configured for the PUCCH resource. In an example, symbols #2-#7 can be determined to be configured for the PUCCH resource based on 731 and 733. Subsequently, the electronic device 110 can transmit UCI on the PUCCH resource.

As described above, the configuration information 140 can indicate the first interlace and the sub-band allocation information of the at least one sub-band within a bandwidth for the PUCCH resource. According to aspects of the disclosure, at least one frequency domain candidate resource (also referred to as frequency domain candidate resource(s) or at least one candidate resource) can be within the at least one sub-band. Resource allocation in the frequency domain for the at least one candidate resource can be determined based at least on the first interlace and the sub-band allocation information. The resource allocation in the frequency domain for the PUCCH resource can be determined from the determined at least one candidate resource. As described above, the bandwidth can be a carrier or a BWP in a carrier.

As described above, the first interlace can include the first set of frequency domain physical resources. The at least one candidate resource can be determined to include a subset of the first set of frequency domain physical resources that is within the at least one sub-band where the subset of the first set of frequency domain physical resources can be a combination or an intersection of the first set of frequency domain physical resources and the at least one sub-band. In an example, the resource allocation in the frequency domain for each of the at least one candidate resource is determined as an intersection of the first set of frequency domain physical resources and a corresponding one of the at least one sub-band.

In an embodiment, the configuration information 140 further indicates the second interlace that includes the second set of frequency domain physical resources. Accordingly, the at least one candidate resource can be determined to include a combined subset of the first set and the second set of frequency domain physical resources that is within the at least one sub-band where the combined subset can be an intersection of the first set and the second set of frequency domain physical resources and the at least one sub-band. In an example, the resource allocation in the frequency domain for each of the at least one candidate resource is determined as an intersection of the first set and the second set of frequency domain physical resources and a corresponding one of the at least one sub-band.

The at least one candidate resource can be configured. In an example, one of the at least one candidate resource is determined or selected to be the PUCCH resource, and the electronic device 110 can transmit UCI on the determined or selected one of the at least one candidate resource. In an example, multiple ones of the at least one candidate resource are determined or selected to be the PUCCH resource, and the electronic device 110 can transmit UCI on each of the determined multiple ones of the at least one candidate resource. In an example, the electronic device 110 can transmit UCI on one of the at least one candidate resource if the one of the at least one candidate resource is available. In an example, the electronic device 110 can transmit UCI on each available one of the at least one candidate resource.

Figure 8:
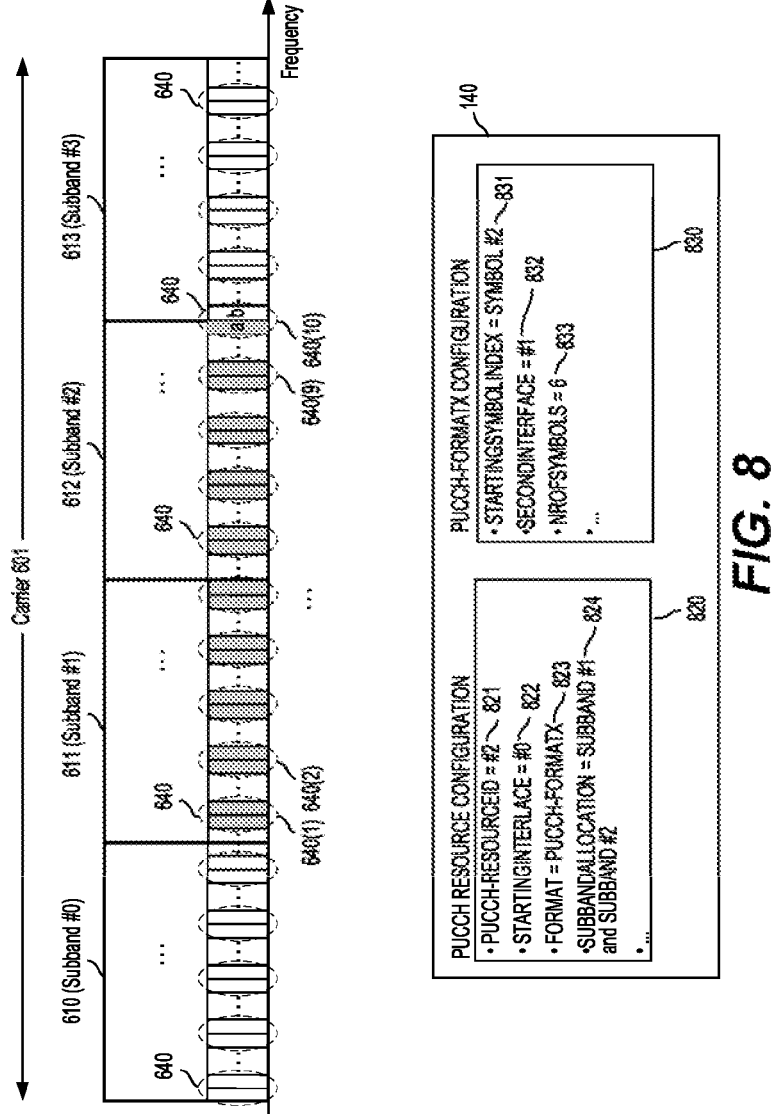
FIG. 8 shows an example of a PUCCH resource that is configured based at least on a first interlace and sub-block allocation information according to embodiments of the disclosure.

FIG. 8 shows an example of the at least one candidate resource according to an embodiment of the disclosure. As described above, the bandwidth is the carrier 601 that includes the sub-bands 610-613 (or the sub-bands #0-#3 in the carrier 601). The at least one candidate resource can be configured for the PUCCH resource (e.g., #2) based on a PUCCH resource configuration 820. The PUCCH resource configuration 820 included in the configuration information 140 can indicate a sub-band allocation information 824, for example, using sub-band indices in the carrier 601, such as SUBBANDALLOCATION=SUBBAND #1 and SUB-BAND #2. The PUCCH resource configuration 820 can indicate a PUCCH resource ID (e.g., #2) 821, a first interlace (e.g., the interlace #0) 822 in the frequency domain, a resource format (e.g., a PUCCH format configuration) (e.g., PUCCH-FORMATX, where 'X' can include a value indicating a specific format) 823, and/or other parameters. In a resource format configuration 830 included in the configuration information 140 corresponding to the indicated resource format 823, a second interlace 832 (e.g., the interlace #1) is indicated. When the second interlace does not exist, the second interlace 832 can be omitted from the resource configuration 830. The resource format configuration 830 can indicate a starting symbol (e.g., a starting symbol index or the symbol #2) 831, a number of symbols (e.g., 6 symbols) 833, and/or other parameters. Similarly, when the number of symbols 833 is equal to 1, the number of symbols 833 can be omitted. Further, the above description can be suitably adapted if the at least one sub-band is located within a BWP. The at least one sub-band can include any suitable number of sub-band(s), such as 1, 2, or the like. A number of interlace(s) configured in the PUCCH resource configuration can be 1, 2, or the like. In an example, the number of interlace(s) is 1 (e.g., the first interlace) or 2 (e.g., the first interlace and the second interlace). The configuration information 140 can indicate the PUCCH format configuration 830 for the PUCCH resource configuration 820 and the PUCCH format configuration 830 can indicate the second interlace 832.

In an example, a first candidate resource in the frequency domain is the intersection of RBs in the first interlace and the second interlace and RBs (e.g., the RBs 640) in the sub-bands 611, and thus the first candidate resource in the frequency domain includes the RBs 640(1)-640(5). A second candidate resource in the frequency domain is the intersection of RBs in the first interlace and the second interlace and RBs (e.g., the RBs 640) in the sub-bands 612, and thus the second candidate resource in the frequency domain includes the RBs 640(6)-640(10).

Figures 9, 10:
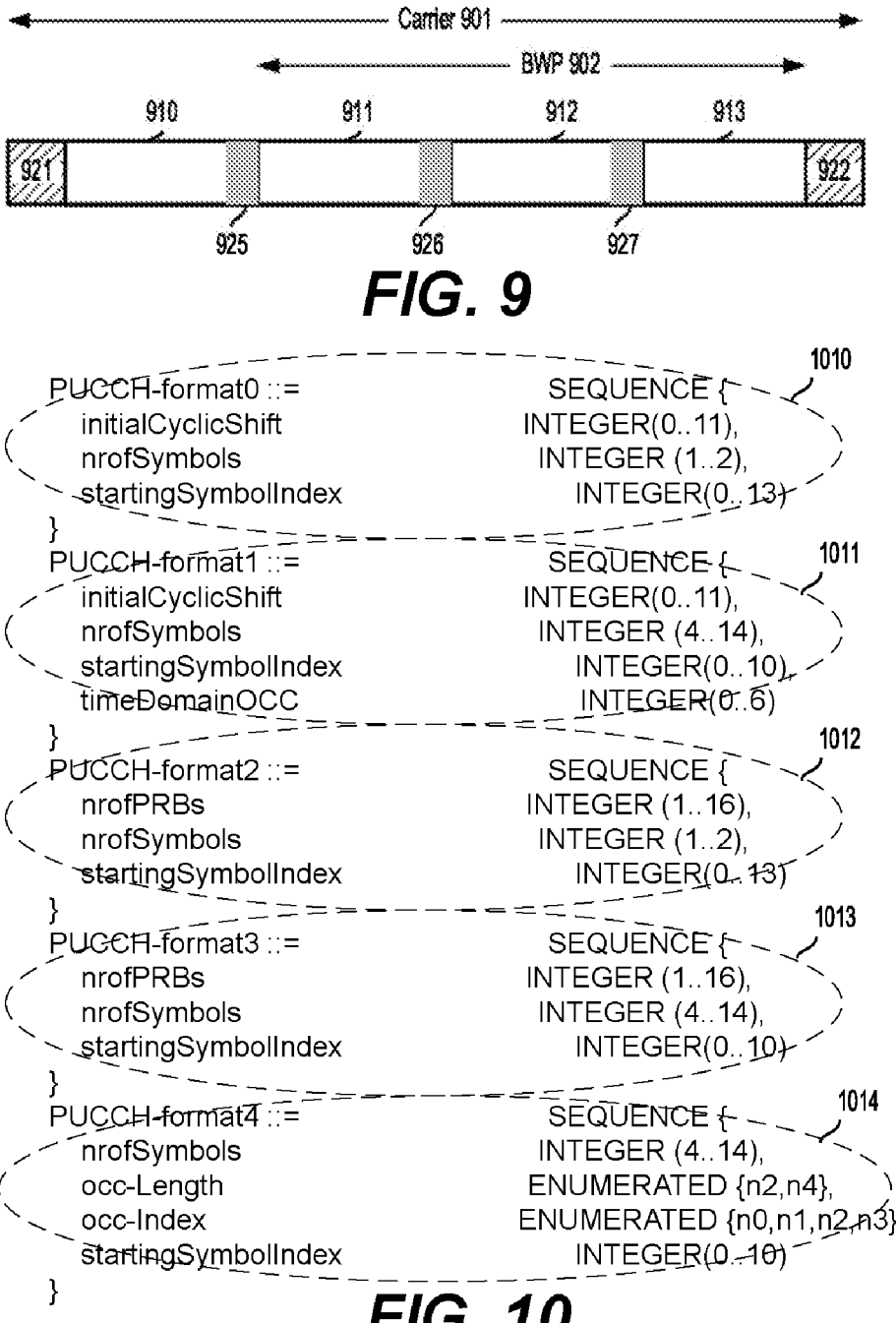

FIG. 9 shows an example of a RB set configuration (also referred to as intra-cell guard-band configuration) according to an embodiment of the disclosure. A bandwidth (e.g., a carrier 901, a BWP 901 in the carrier 901) can be provided with no or any suitable number of intra-cell (also referred to as intra-carrier) guard-bands by RRC configuration, a default configuration, or the like, for example, for operation with shared spectrum channel access. The number of intra-cell guard-bands in the bandwidth can be 0, 1, 2, or the like.

The intra-cell guard-bands can divide the bandwidth into a plurality of RB sets based on the RB set configuration. Each of the plurality of RB sets can include a subset of (available) RBs of the bandwidth. An intra-cell guard-band can include RB(s), such as common RBs (CRBs), and thus the intra-cell guard-band can be defined by a starting CRB and a size of the intra-cell guard-band that is specified by a number of CRBs in the intra-cell guard-band. The number of CRBs can be any suitable non-negative integer, such as 0, 1, 2, or the like. The size of the intra-cell guard-band or the number of CRBs can be zero, and thus no intra-cell guard-band is configured. In another example, if no RB set configuration (also referred to as intra-cell guard-band configuration) is provided for the bandwidth, one RB set still can be defined within the bandwidth, where the RB set can include all (available) RBs of the bandwidth.

The one or more RB sets in the bandwidth can be determined, for example, by the electronic device 110 according to the intra-cell guard-band configuration for the bandwidth. As described above, the bandwidth can be the carrier 901 or the BWP 902 in the carrier 901.

Referring to FIG. 9, the carrier 901 can be divided into RB sets 910-913 by intra-carrier guard-bands 925-927. The carrier 901 can further include inter-cell (also referred to as inter-carrier) guard-bands 921-922. In an example, the RB sets 910-913 are located between the inter-cell guard-bands 921-922. One of the inter-cell guard-bands 921-922 can separate the carrier 901 from another carrier. RB set indices within the carrier 901 for the RB sets 910-913 are 0, 1, 2, and 3, respectively.

The BWP 902 can be divided into the RB sets 911-913 by the intra-cell guard-bands 926-927. RB set indices within the BWP 902 for the RB sets 911-913 can be 0, 1, and 2, respectively. In an example, the RB sets 911-913 are located between the inter-cell guard-band 922 and the intra-cell guard-band 925. In general, a carrier can be configured with one or more BWPs. When the carrier includes a plurality of BWPs, RB sets within one of the plurality of BWPs may be located between two intra-cell guard-bands within the carrier.

Various PUCCH resource configurations (e.g., the PUCCH resource configurations 220, 420, 520, 620, 720, and 820) including various parameters are described above. In some embodiments, a PUCCH resource can include parameters, such as a PUCCH resource index provided by pucch-ResourceId (e.g., 221 in FIG. 2) and a resource format configuration (e.g., the PUCCH-FORMATX CONFIGURATION 230 in FIG. 2) for a PUCCH format provided by a resource format (e.g., 223 in FIG. 2).

In some examples, if an UE (e.g., the electronic device 110) is not configured with interlace(s), and thus the UE is not provided with use Interlace PUCCH-PUSCH in BWP-Uplink Dedicated, the PUCCH resource can further include parameters, such as an index of a first PRB prior to frequency hopping or when there is no frequency hopping, such as the starting PRB 222 in FIG. 2, an index of the first PRB after frequency hopping by second Hop PRB, and an indication for the frequency hopping (e.g., intra-slot frequency hopping) by intraSlot Frequency-Hopping.

In some examples, if the UE (e.g., the electronic device 110) is configured with the interlace(s), and thus the UE is provided with use Interlace PUCCH-PUSCH in BWP-Uplink Dedicated, the PUCCH resource can further include parameters, such as an index of a first interlace by interlace0 (e.g., starting interlace 422 in FIG. 4), an index of an RB set (or an RB set index) by rb-SetIndex. The RB set can correspond to a sub-band, and the index of the RB set can correspond to a sub-band index (e.g., 724).

If the UE (e.g., the electronic device 110) is provided with use Interlace PUCCH-PUSCH in BWP-Uplink Dedicated, the UE can determine available RBs (e.g., the RBs 640(1)-640(5) in FIG. 7) for PUCCH transmissions with an active uplink (UL) BWP (e.g., the BWP 701 in FIG. 7) as an intersection for first RBs (e.g., RBs 640 in FIG. 7) corresponding to an interlace index provided by interlace0 (e.g., the first interlace or the interlace #0 722) and if provided, interlace1 (e.g., the second interlace or the interlace #1 732), and second RBs (e.g., RBs within the sub-band 611 in FIG. 7) of an RB set (e.g., the sub-band 611) provided by rb-SetIndex (e.g., the sub-band #0 724). The intersection described above can result in $$M_{interlace,0}^{PUCCH}$$

RBs in the first interlace (e.g., indicated by interlace0).

$$M_{interlace,0}^{PUCCH}$$

can be 10 or 11. If the second interlace (e.g., indicated by interlace1) is provided, the intersection can result in $$M_{interlace,1}^{PUCCH}$$

RBs in the second interlace.

$$M_{interlace,1}^{PUCCH}$$

can be 10 or 11.

As described above, the PUCCH resource can include the resource format configuration (e.g., the PUCCH-FOR-MATX CONFIGURATION 230, 430, 530, 630, 730, or 830) for the PUCCH format provided by the resource format (e.g., the PUCCH-FORMATX in 223, 423, 523, 623, 723, or 823). Any suitable PUCCH format can be used. FIGS. 10-11 show examples of PUCCH formats (or resource formats) 1010-1016 according to embodiments of the disclosure. If the resource format indicates the PUCCH format 1010 or a PUCCH-format0 (e.g., X=0 in the PUCCH-FORMATX), the PUCCH format configured for the PUCCH resource is the PUCCH-format0. Accordingly, the PUCCH resource can include an index for an initial cyclic shift provided by initial Cyclic Shift, a number of symbols for a PUCCH transmission provided by nrofSymbols, and a first symbol for the PUCCH transmission provided by starting Symbol Index. The index for the initial cyclic shift (e.g., initial Cyclic Shift) can be any integer in a range of 0 to 11, the number of symbols for the PUCCH transmission (e.g., nrofSymbols) can be 1 or 2, the first symbol for the PUCCH transmission (e.g., starting Symbol Index) can be any integer in a range of 0 to 13.

If the resource format indicates the PUCCH format 1011 or a PUCCH-format1 (e.g., X=1 in the PUCCH-FOR-MATX), the PUCCH format configured for the PUCCH resource is the PUCCH-format1. Accordingly, the PUCCH resource can include an index for an initial cyclic shift provided by initial Cyclic Shift, a number of symbols for a PUCCH transmission provided by nrofSymbols, a first symbol for the PUCCH transmission provided by starting Symbol Index, and an index for an orthogonal cover code (OCC) by time Domain OCC. The index for the initial cyclic shift (e.g., initial Cyclic Shift) can be any integer in a range of 0 to 11, the number of symbols for the PUCCH transmission (e.g., nrofSymbols) can be any integer in a range of 4 to 14, the first symbol for the PUCCH transmission (e.g., starting Symbol Index) can be any integer in a range of 0 to 10, and the index for the OCC (e.g., time Domain OCC) can be any integer in a range of 0 to 6.

If the resource format indicates the PUCCH format 1012 or a PUCCH-format2 (e.g., X=2 in the PUCCH-FOR-MATX), the PUCCH format configured for the PUCCH resource is the PUCCH-format2. Accordingly, the PUCCH resource can include a number of PRBs provided by nrof-PRBs, a number of symbols for a PUCCH transmission provided by nrofSymbols, and a first symbol for the PUCCH transmission provided by starting Symbol Index. The number of PRBs (e.g., nrofPRBs) can be any integer in a range of 1 to 16, the number of symbols for the PUCCH transmission (e.g., nrofSymbols) can be 1 or 2, the first symbol for the PUCCH transmission (e.g., starting Symbol Index) can be any integer in a range of 0 to 13.

If the resource format indicates the PUCCH format 1013 or a PUCCH-format3 (e.g., X=3 in the PUCCH-FOR-MATX), the PUCCH format configured for the PUCCH resource is the PUCCH-format3. Accordingly, the PUCCH resource can include a number of PRBs provided by nrof-PRBs, a number of symbols for a PUCCH transmission provided by nrofSymbols, and a first symbol for the PUCCH transmission provided by starting Symbol Index. The number of PRBs (e.g., nrofPRBs) can be any integer in a range of 1 to 16, the number of symbols for the PUCCH transmission (e.g., nrofSymbols) can be any integer in a range of 4 to 14, the first symbol for the PUCCH transmission (e.g., starting Symbol Index) can be any integer in a range of 0 to 10.

If the resource format indicates the PUCCH format 1014 or a PUCCH-format4 (e.g., X=4 in the PUCCH-FOR-MATX), the PUCCH format configured for the PUCCH resource is the PUCCH-format4. Accordingly, the PUCCH resource can include a number of symbols for a PUCCH transmission provided by nrofSymbols, an OCC length provided by occ-Length, an OCC index provided by occ-index, and a first symbol for the PUCCH transmission provided by starting Symbol Index. The number of symbols for the PUCCH transmission (e.g., nrofSymbols) can be any integer in a range of 4 to 14, the OCC length (e.g., occ-Length) can be enumerated as {n2, n4}, the OCC index (e.g., occ-Index) can be enumerated as {n0, n1, n2, n3}, and the first symbol for the PUCCH transmission (e.g., starting Symbol Index) can be any integer in a range of 0 to 10.

In an embodiment, if the UE is provided by use Interlace PUCCH-PUSCH in BWP-Uplink Dedicated and the resource format indicates the PUCCH format 1015 or a PUCCH-format2-r16, the PUCCH resource can further include, if provided, an index of a second interlace by interlace1 or interlace1-r16. The index of the second interlace (e.g., interlace1 or interlace1-r16) can be any integer in a range of 0 to 9. In an example, if the resource format indicates the PUCCH format 1015 or the PUCCH-format2-r16 and interlace1 is not provided, the PUCCH resource can include, if provided, an OCC length by OCC-Length-r16, and an OCC index by OCC-Index-r16.

In an embodiment, if the UE is provided by use Interlace PUCCH-PUSCH in BWP-Uplink Dedicated and the resource format indicates the PUCCH format 1016 or a PUCCH-format3-r16, the PUCCH resource can further include, if provided, the index of the second interlace by interlace1 or interlace1-r16. The index of the second interlace (e.g., interlace1 or interlace1-r16) can be any integer in a range of 0 to 9. In an example, if the resource format indicates the PUCCH format 1016 or the PUCCH-format3-r16 and interlace1 is not provided, the PUCCH resource can include, if provided, the OCC length by OCC-Length-r16, and the OCC index by OCC-Index-r16. In an example, the UE can assume that $$M_{RB}^{PUCCH,3}$$

PRBs with lowest indices within the first interlace, and if configured, the second interlace are used for the PUCCH transmission.

Referring to FIG. 11, in an example, the PUCCH-format2-r16 and the PUCCH-format3-r16 can include a number of symbols for the PUCCH transmission provided by nrofSymbols and a first symbol for the PUCCH transmission provided by starting Symbol Index. For the PUCCH-format2-r16, the number of symbols for the PUCCH transmission (e.g., nrofSymbols) can be 1 or 2 and the first symbol for the PUCCH transmission (e.g., starting Symbol Index) can be any integer in a range of 0 to 13. For the PUCCH-format3-r16, the number of symbols for the PUCCH transmission (e.g., nrofSymbols) can be any integer in a range of 4 to 14 and the first symbol for the PUCCH transmission (e.g., starting Symbol Index) can be any integer in a range of 0 to 10.

Figure 12:
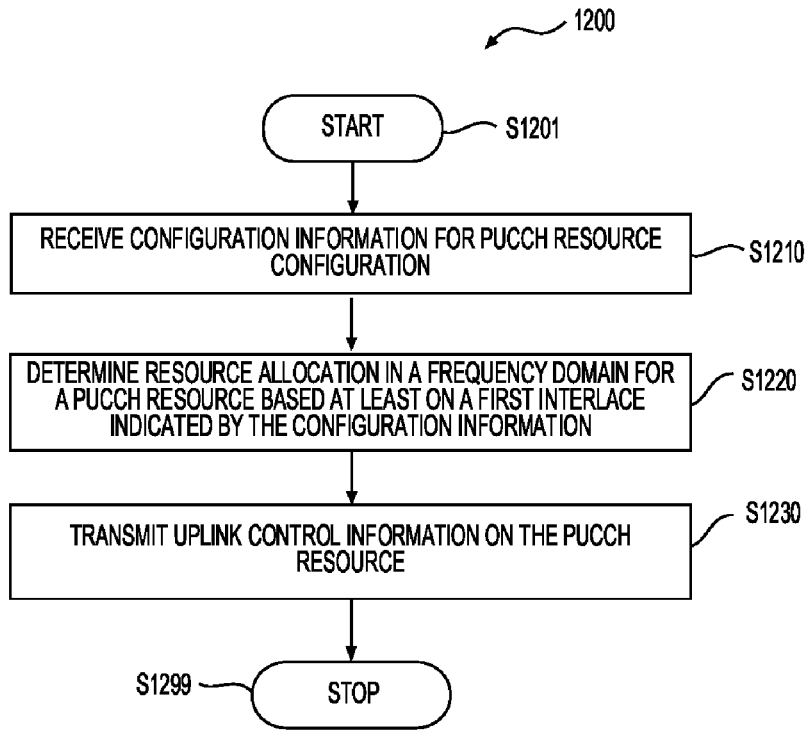
FIG. 12 shows a flow chart of an exemplary process 1200 according to an embodiment of the disclosure.

FIG. 12 shows a flowchart of an exemplary process 1200 according to an embodiment of the disclosure. The process 1200 can be implemented by an electronic device (e.g., the electronic device 110). The process 1200 starts at S1201 and proceeds to S1210.

At S1210, configuration information for PUCCH resource configuration can be received from a network (e.g., the network 101) in a wireless communication system (e.g., the wireless communication system 100). As described above, such as with reference to FIGS. 4-8, the configuration information (e.g., the configuration information 140) can indicate a first interlace that includes a first set of frequency domain physical resources for a PUCCH resource. Further, in various examples, the configuration information can indicate a second interlace, a number of one or more interlaces, sub-band allocation information, and/or the like that are for the PUCCH resource. In addition to the frequency domain physical resource information described above, the configuration information can indicate time domain resource information (e.g., a starting symbol such as a starting symbol index, a number of symbols, and/or the like). The configuration information can indicate the frequency domain physical resource information and the time domain resource information based on a PUCCH resource configuration (e.g., 420, 520, 620, 720, and 820 shown in FIGS. 4-8, respectively) and a PUCCH format configuration (e.g., 430, 530, 630, 730, and 830 shown in FIGS. 4-8, respectively) corresponding to a PUCCH format. Various PUCCH formats are described above with reference to FIGS. 2, 4-8, 10, and 11. In an example, the configuration information indicates the PUCCH format configuration for the PUCCH resource configuration and the PUCCH format configuration indicates the second interlace.

At S1220, resource allocation in the frequency domain for the PUCCH resource can be determined based at least on the first interlace, as described above with reference to FIGS. 4-8.

At S1230, UCI can be transmitted on the PUCCH resource from the electronic device to the network, as described above. The process 1200 proceeds to S1299, and terminates.

Steps in the process 1200 can be implemented using any suitable order. Further, one or more of the steps in the process 1200 can be modified, combined, or omitted. Additional step(s) can be added. For example, prior to S1230, resource allocation in the time domain for the PUCCH resource can be determined based on the time domain resource information, such as the starting symbol index and the number of symbols (if available) indicated in the PUCCH format, as described above.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method for wireless communication performed by a user equipment (UE), comprising:

receiving, by the UE, configuration information for physical uplink control channel (PUCCH) resource configuration from a network in a wireless communication system, the configuration information indicating a first interlace that includes a first set of frequency domain physical resources;

determining, by the UE, resource allocation in a frequency domain for a PUCCH resource based at least on the first interlace; and transmitting, by the UE, uplink control information (UCI) on the PUCCH resource;

wherein the configuration information further indicates sub-band allocation information of at least one sub-band within a bandwidth for the PUCCH resource, and determining the resource allocation includes determining the resource allocation in the frequency domain for the PUCCH resource based at least on the first interlace and the sub-band allocation information;

wherein the configuration information further indicates a second interlace that includes a second set of frequency domain physical resources, and determining the resource allocation includes determining the resource allocation in the frequency domain for the PUCCH resource as an intersection of the first set and the second set of frequency domain physical resources and the at least one sub-band.

2. The method according to claim 1, wherein the configuration information further indicates a second interlace that includes a second set of frequency domain physical resources; and determining the resource allocation includes determining the resource allocation in the frequency domain for the PUCCH resource based on the first interlace and the second interlace.

3. The method according to claim 2, wherein the configuration information further indicates a PUCCH format configuration for the PUCCH resource and the PUCCH format configuration indicates the second interlace.

4. The method according to claim 1, wherein the configuration information further indicates a number of one or more interlaces for the PUCCH resource, the one or more interlaces including the first interlace; and determining the resource allocation includes determining the resource allocation in the frequency domain for the PUCCH resource based on the one or more interlaces.

5. The method according to claim 1, wherein determining the resource allocation comprises:

determining the resource allocation in the frequency domain for the PUCCH resource as an intersection of the first set of frequency domain physical resources and the at least one sub-band.

6. The method according to claim 1, wherein the bandwidth is a carrier or a bandwidth part (BWP) in a carrier.

7. The method according to claim 1, wherein the configuration information further indicates sub-band allocation information of at least one sub-band within a bandwidth for the PUCCH resource; and determining the resource allocation further includes:

determining resource allocation in the frequency domain for at least one candidate resource based at least on the first interlace and the sub-band allocation information; and determining the resource allocation in the frequency domain for the PUCCH resource from the at least one candidate resource.

8. The method according to claim 7, wherein determining the resource allocation in the frequency domain for the at least one candidate resource comprises:

determining the resource allocation in the frequency domain for each of the at least one candidate resource as an intersection of the first set of frequency domain physical resources and a corresponding one of the at least one sub-band.

9. The method according to claim 7, wherein the configuration information further indicates a second interlace that includes a second set of frequency domain physical resources; and determining the resource allocation in the frequency domain for the at least one candidate resource includes determining the resource allocation in the frequency domain for each of the at least one candidate resource as an intersection of the first set and the second set of frequency domain physical resources and a corresponding one of the at least one sub-band.

10. An electronic device for wireless communication, comprising:

a transceiver configured to:

receive, at a user equipment (UE), configuration information for physical uplink control channel (PUCCH)

resource configuration from a network in a wireless communication system, the configuration information indicating a first interlace that includes a first set of frequency domain physical resources; and transmit, from the UE, uplink control information (UCI) on a PUCCH resource; and processing circuitry configured to determine, at the UE, resource allocation in a frequency domain for the PUCCH resource based at least on the first interlace;

wherein the configuration information further indicates sub-band allocation information of at least one sub-band within a bandwidth for the PUCCH resource, and the processing circuitry is configured to determine the resource allocation in the frequency domain for the PUCCH resource based at least on the first interlace and the sub-band allocation information;

wherein the configuration information further indicates a second interlace that includes a second set of frequency domain physical resources, and the processing circuitry is configured to determine the resource allocation in the frequency domain for the PUCCH resource as an intersection of the first set and the second set of frequency domain physical resources and the at least one sub-band.

11. The electronic device according to claim 10, wherein the configuration information further indicates a second interlace that includes a second set of frequency domain physical resources; and the processing circuitry is configured to determine the resource allocation in the frequency domain for the PUCCH resource based on the first interlace and the second interlace.

12. The electronic device according to claim 11, wherein the configuration information further indicates a PUCCH format configuration for the PUCCH resource and the PUCCH format configuration indicates the second interlace.

13. The electronic device according to claim 10, wherein the configuration information further indicates a number of one or more interlaces for the PUCCH resource, the one or more interlaces including the first interlace; and the processing circuitry is configured to determine the resource allocation in the frequency domain for the PUCCH resource based on the one or more interlaces.

14. The electronic device according to claim 10, wherein the processing circuitry is configured to determine the resource allocation in the frequency domain for the PUCCH resource as an intersection of the first set of frequency domain physical resources and the at least one sub-band.

15. The electronic device according to claim 10, wherein the bandwidth is a carrier or a bandwidth part (BWP) in a carrier.

16. The electronic device according to claim 10, wherein the configuration information further indicates sub-band allocation information of at least one sub-band within a bandwidth for the PUCCH resource; and the processing circuitry is configured to:

determine resource allocation in the frequency domain for at least one candidate resource based at least on the first interlace and the sub-band allocation information; and determine the resource allocation in the frequency domain for the PUCCH resource from the at least one candidate resource.

* * * * *